(12) United States Patent
Spears et al.

(10) Patent No.: US 10,287,005 B2
(45) Date of Patent: May 14, 2019

(54) FRICTION DAMPER WITH CENTERING FLEXURE

(71) Applicant: BELL HELICOPTER TEXTRON INC., Fort Worth, TX (US)

(72) Inventors: Steven Kirk Spears, Hurst, TX (US); Andrea Cheri Chavez, Colleyville, TX (US); Brad Jeffrey Ekstrom, Colleyville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 843 days.

(21) Appl. No.: 14/657,478

(22) Filed: Mar. 13, 2015

(65) Prior Publication Data

US 2016/0264237 A1  Sep. 15, 2016

(51) Int. Cl.
| | | |
|---|---|---|
| *B64C 27/14* | (2006.01) |
| *B64C 27/82* | (2006.01) |
| *F16C 27/00* | (2006.01) |
| *F16C 19/00* | (2006.01) |
| *F16C 32/04* | (2006.01) |

(52) U.S. Cl.
CPC .............. *B64C 27/14* (2013.01); *B64C 27/82* (2013.01); *F16C 19/00* (2013.01); *F16C 27/00* (2013.01); *F16C 32/0425* (2013.01); *F16C 2326/43* (2013.01)

(58) Field of Classification Search
CPC .......... F16C 27/00; F16C 27/04; F16C 27/06; F16C 19/00; F16C 32/0425; F16C 2326/43; F16F 1/187; F16F 7/02; F16F 7/04; F16F 15/04; F16F 15/06; F16F 15/073; F16F 15/021; E04H 12/22; B64C 27/001; B64C 2027/002; B64C 2027/003; B64C 2027/004; B64C 27/14; B64C 27/82; B60K 17/24
USPC ........ 248/560, 636, 638, 591, 599, 519, 534
See application file for complete search history.

(56) References Cited

U.S. PATENT DOCUMENTS

| | | | | |
|---|---|---|---|---|
| 3,494,678 A | * | 2/1970 | Fekete ................... | F16C 27/00 384/222 |
| 4,134,309 A | * | 1/1979 | Balke .................. | F16F 15/0237 248/562 |
| 4,333,535 A | * | 6/1982 | Hentrich, Sr. ......... | A01B 21/08 172/566 |
| 4,365,771 A | * | 12/1982 | Halwes ................. | B64C 27/001 188/378 |
| 5,033,875 A | * | 7/1991 | Moulinet ............... | B60K 17/24 384/536 |
| 5,217,198 A | * | 6/1993 | Samarov ............... | F16F 15/085 248/628 |
| 5,358,210 A | * | 10/1994 | Simon ...................... | F16F 1/40 244/173.2 |
| 5,853,260 A | * | 12/1998 | Curbillon ................ | F16C 11/06 384/192 |
| 6,057,618 A | * | 5/2000 | Brunken, Jr. ......... | F16C 39/063 248/609 |
| 6,168,530 B1 | * | 1/2001 | Guimbal ................. | B64C 27/12 384/498 |

(Continued)

*Primary Examiner* — Alan B Waits
(74) *Attorney, Agent, or Firm* — James E. Walton (57) ABSTRACT

A tail rotor drive system (TRDS) has a shaft, a housing extending around the shaft, a mount coupled to the housing via a friction assembly and a flexure, and a bearing assembly disposed between the housing and the shaft.

17 Claims, 6 Drawing Sheets

(56) References Cited

U.S. PATENT DOCUMENTS

| | | | | |
|---|---|---|---|---|
| 6,254,070 B1* | 7/2001 | Runge | ............... | F16F 1/025 |
| | | | | 248/628 |
| 6,513,753 B1* | 2/2003 | Toni | ............... | B29C 70/86 |
| | | | | 244/17.27 |
| 7,109,619 B2* | 9/2006 | Brunken, Jr. | ............... | F16C 27/04 |
| | | | | 248/638 |
| 7,553,123 B2* | 6/2009 | Casaro | ............... | F01D 25/164 |
| | | | | 384/536 |
| 7,771,126 B2* | 8/2010 | Faass | ............... | B64C 27/14 |
| | | | | 248/580 |
| 7,901,142 B2* | 3/2011 | Mathis | ............... | F16C 27/04 |
| | | | | 384/535 |
| 8,516,790 B2* | 8/2013 | Hogie | ............... | F02K 1/766 |
| | | | | 239/265.25 |
| 9,181,987 B2* | 11/2015 | Nevers | ............... | F16D 3/24 |
| 9,677,607 B2* | 6/2017 | Nevers | ............... | F16C 27/02 |
| 2016/0200429 A1* | 7/2016 | Nevers | ............... | F16F 15/021 |
| | | | | 464/180 |
| 2016/0327098 A1* | 11/2016 | Long, Jr. | ............... | F01D 25/164 |

* cited by examiner

FRICTION DAMPER WITH CENTERING FLEXURE

BACKGROUND

1. Field of the Invention

The present application relates to rotating shafts. In particular, the present application relates to friction dampers for rotating shafts of helicopter tail rotor drive systems.

2. Description of Related Art

Some helicopters comprise tail rotor drive systems (TRDSs) that have many subcritical shaft segments joined together by couplings. In some cases, the couplings provide slight deviation and axial offsetting of adjacent shaft segments so that the shaft assembly lies generally along a curvature. To join the many shaft segments, flanged adapters are located at the ends of the shaft segments. Hangar bearings are utilized to restrain many of the shaft segments. The flanged adapters of the shaft segments, the many couplings, and the multiple hangar bearings are undesirably heavy and costly.

There are many known ways to reduce TRDS weight and cost, however, considerable shortcomings remain.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

In some cases, the number of shaft sections of a TRDS can be reduced by utilizing fewer long shaft sections that are designed to operate at supercritical rotational speeds. Use of such so-called supercritical shafts can reduce TRDS weight and cost by reducing the number of shaft sections, couplings, and hangar bearings. In some supercritical TRDSs, conventional dampers are utilized that normally do not always contact the rotating shaft, but instead, the conventional dampers contact the rotating shaft during start up or shut down as the rotating shaft transitions through a critical speed below the operating speed. The conventional dampers are only required to function for very short and infrequent periods of time and are configured to transmit rotating to fixed system motion through direct contact between the rotating shaft surface and non-rotating conventional damper surface. However, dampers for use with the supercritical shafts of this disclosure need to be able to react steady loads that are attributable to the maintained bending of the supercritical shaft. Accordingly, the dampers for use with the supercritical shafts of this disclosure constantly contact the supercritical shafts.

Figure 1:
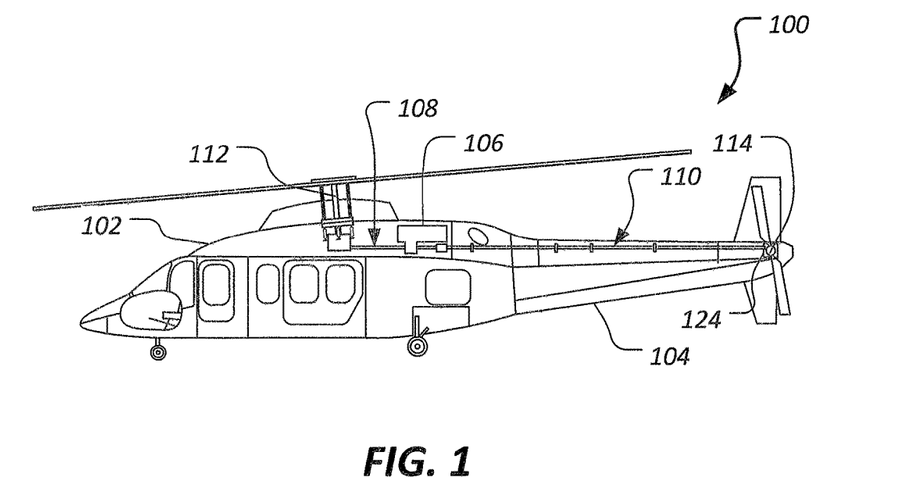
FIG. 1 is an orthogonal schematic side view of a helicopter according to the present application.
Figure 2:
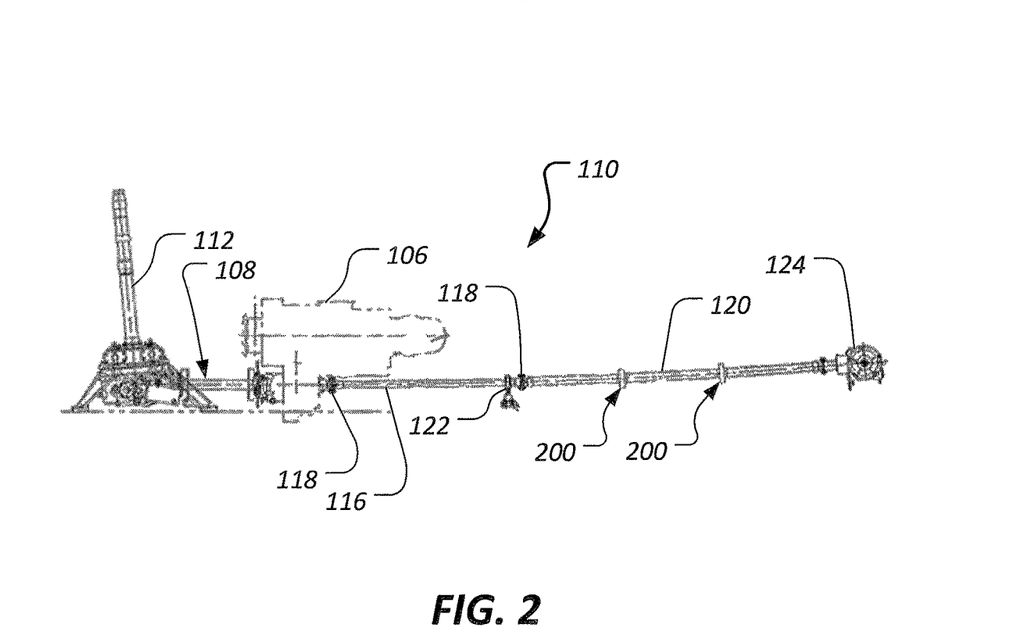
FIG. 2 is an orthogonal schematic side view of a TRDS of the helicopter of FIG. 1.
Figure 3:
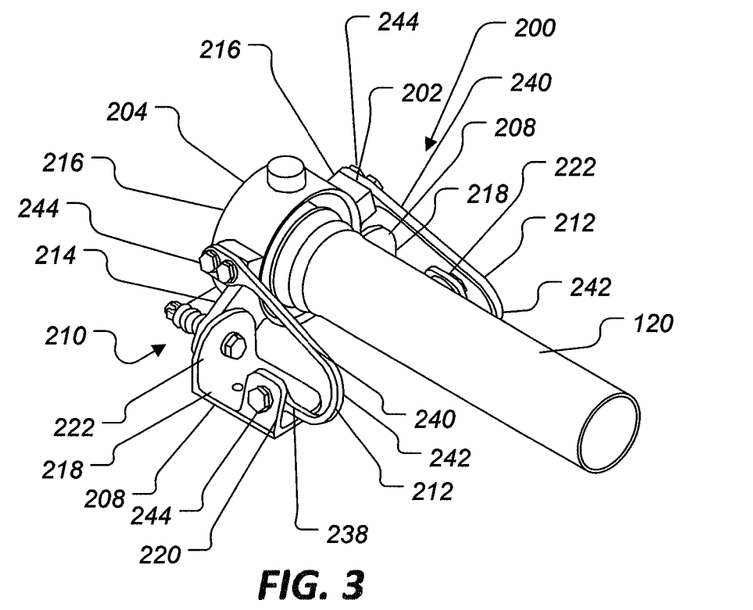
FIG. 3 is an oblique view of a damper system of the TRDS of FIG. 2.
Figure 4:
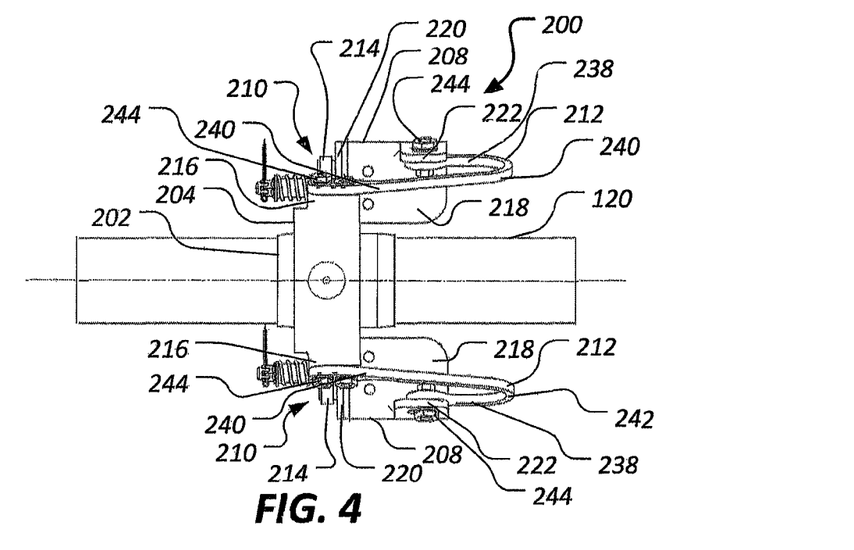
FIG. 4 is an orthogonal top view of the damper system of FIG. 3.
Figure 5:
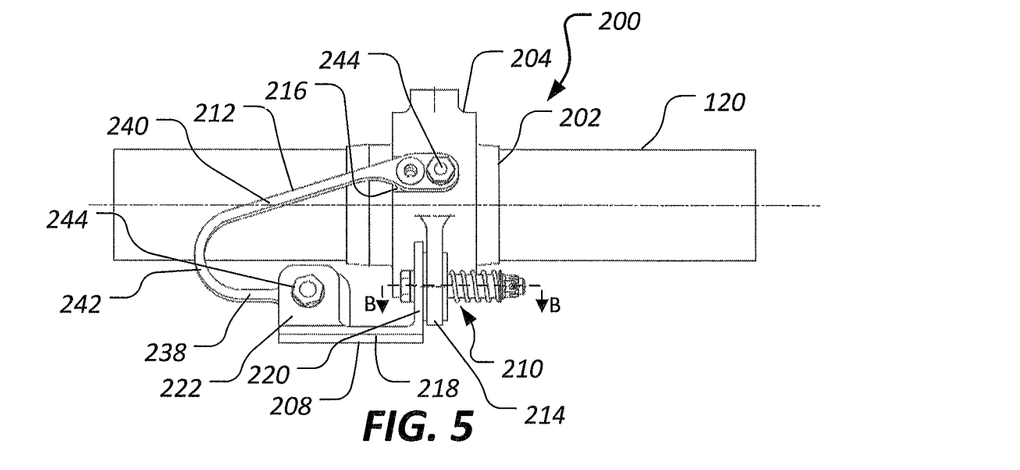
FIG. 5 is an orthogonal side view of the damper system of FIG. 3.

Referring to FIG. 1 in the drawings, a helicopter 100 according to the present disclosure is shown. The helicopter 100 generally comprises a fuselage 102, a tail boom 104, an engine 106, a main rotor drive system 108, and a tail rotor drive system (TRDS) 110. The main rotor drive system 108 is coupled to the engine 106 to drive a primary rotor mast 112. The tail rotor drive system 110 is coupled to the engine 106 to drive a tail rotor mast 114. Referring to FIG. 2 in the drawings, the TRDS 110 is shown in greater detail. The TRDS 110 generally comprises a subcritical shaft 116 coupled to the engine 106 via a coupling 118. The subcritical shaft 116 is also coupled to a supercritical shaft 120 via a coupling 118. The subcritical shaft 116 is supported by a hangar bearing 122. The supercritical shaft 120 is coupled to a gearbox 124. Still further, the supercritical shaft 120 is associated with two friction dampers 200.

Referring now to FIGS. 3-7, a friction damper 200 is shown in greater detail. The friction damper 200 comprises a shaft sleeve 202, a damper housing 204, and a bearing assembly 206. The friction damper 200 further comprises a pair of mounts 208. Each mount 208 is rigidly coupled to a structural component of the tail boom 104 as well as to the damper housing 204 via a friction assembly 210 and a flexure 212. In some cases, the flexure 212 can comprise titanium and/or any other suitable material selected to provide adequate stiffness and elastic properties. Each housing 204 comprises a pair of integral sliding rings 214 for coupling with the friction assemblies 210 and a pair of integral pads 216 for coupling with the flexures 212. Each of the mounts 208 comprise a base plate 218, a friction tab 220 for coupling to the friction assembly 210, and a flexure tab 222 for coupling to the flexure 212.

Figure 8:
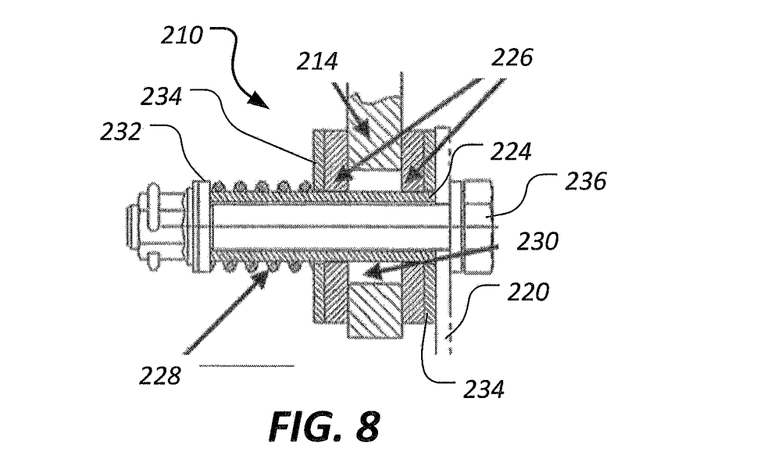
FIG. 8 is an orthogonal side cross-sectional view of a friction system of the damper system of FIG. 3 taken along cutting line B-B of FIG. 5.

Referring now to FIG. 8 a cross-sectional side view of a friction assembly 210 is shown in greater detail. The friction assembly 210 generally comprises a pin assembly 224 configured to pass through a clearance hole 230 of a sliding ring 214. The diameter of the clearance hole 230 is significantly greater than the diameter of the portion of the pin assembly 224 that resides in the clearance hole 230. The friction assembly 210 further comprises a biasing spring 228 captured by the pin assembly 224 between a removable nut 232 of the pin assembly and a first washer 234 of the friction assembly. A first friction ring 226 is similarly captured between the first washer 234 and the sliding ring 214. The sliding ring 214 is also captured between the above-described first friction ring 226 and second friction ring 226. The second friction ring 226 is captured between the sliding ring 214 and a second washer 234. The second washer 234 is captured between the second friction ring 226 and the friction tab 220 and the friction tab 220 is captured between a head 236 of the pin assembly 224 and the second washer 234. Altogether, the friction assembly 210 is configured to utilize the biasing spring 228 to sandwich the sliding ring 214 between the friction rings 226 with a predetermined compressive force so that movement of the housing 204 relative to the mount 208 is resisted. In cases where the housing 204 does move radially relative to the mount 208, at least a portion of the energy causing the movement is turned to heat by the friction generated by the forcible rubbing of the sliding ring 214 against the friction rings 226. In some embodiments, the friction rings 226 can comprise polyimide-based plastics, polytetrafluoroethylene, and or any other suitable material.

Figure 6:
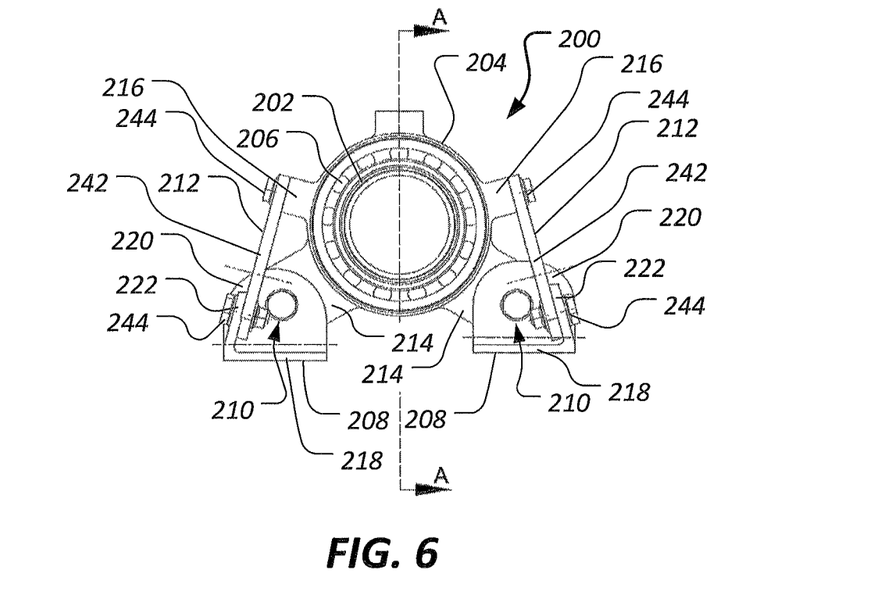
FIG. 6 is an orthogonal end view of the damper system of FIG. 3.
Figure 7:
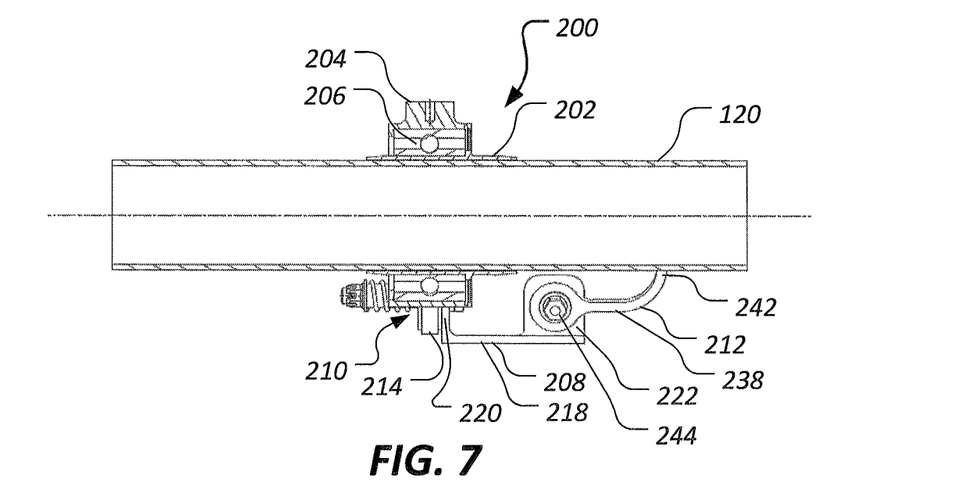
FIG. 7 is an orthogonal side cross-sectional view of the damper system of FIG. 3 taken along cutting line A-A of FIG. 6.

Referring back to FIGS. 3-7, each flexure 212 is generally U-shaped and comprises a first leg 238 connected to a second leg 240 via a curved portion 242. In this embodiment, the first leg 238 is generally shorter than the second leg 240. The first leg 238 is coupled to a flexure tab 222 using fasteners 244 such as bolts and the second leg 240 is coupled to an associated integral pad 216 using fasteners 244 such as bolts. In this embodiment, the flexure 212 generally comprises a plate-like construction insofar as the flexure 212 has a substantially constant thickness. As best shown in FIG. 6, when the flexures 212 are undeflected in the horizontal direction, a central axis of the supercritical shaft 120 is maintained substantially centered left-right (as viewed in FIG. 6) between the friction assemblies 210. In other words, when the flexures 212 are not deflected out of their generally flat plate-like shape, the supercritical shaft 120 is maintained substantially centered left-right (as viewed in FIG. 6). Further, when the flexures 212 are not deflected to generally move the first leg 238 toward or away from the second leg 240 (such as by generally maintaining the relative spacing between the first leg 238 and the second leg 240 provided by the curved portion 242), the central axis of the supercritical shaft 120 is generally maintained without up-down movement (as viewed in FIG. 6). However, if the flexure 212 is generally compressed to move the first leg 238 toward the second leg 240 in a manner that generally reduces an angle between the them, the central axis of the supercritical shaft 120 is moved downward (as viewed in FIG. 6). Alternatively, if the flexure 212 is generally pulled to move the first leg 238 away from the second leg 240 in a manner that generally increases an angle between them, the central axis of the supercritical shaft 120 is moved upward (as viewed in FIG. 6). Of course, each flexure 212 may be elastically deformed so that complex movements of the central axis of the supercritical shaft 120 result.

Although flexures 212 are described above as comprising a particular shape and form, in alternative embodiments, flexures can be provided that are shaped and formed differently. Alternative embodiments of flexures are contemplated as comprising any other suitable shape and form configured to provide an elastically deformable flexible joint between the mounts 208 and the damper housings 204 where the elastic flexible joint is configured to bias the damper housings 204 and associated supercritical shaft 120 toward a predetermined location, such as an axially centered location, relative to the mounts 208. More specifically, while the flexures 212 comprise a substantially plate-like constant material thickness, alternative embodiments of flexures can comprise multiple and/or variable thicknesses so that elastic deflection of the flexures can be provided at reduced thickness portions of the flexures. In some flexure embodiments, a flexure can comprise a serpentine-like path shape, a tortuous path shape, and/or any other path shape comprising a plurality of directional path changes. In some flexure embodiments, a flexure can comprise a path shape that is more three-dimensional as compared to the U-shaped path of the flexure 212. For example, an alternative embodiment of a flexure can comprise a coiled and/or helical shaped path. Still further, in some alternative embodiments, flexures 212 and/or any other of the flexures disclosed herein can be formed integrally with at least one of the mounts 208 and damper housings 204. While some embodiments described above comprise two flexures 212, alternative embodiments can comprise more or fewer flexures and the flexures can be located at different and/or additional angular locations relative to the central axis of the supercritical shaft and/or damper housing 204.

Figure 9:
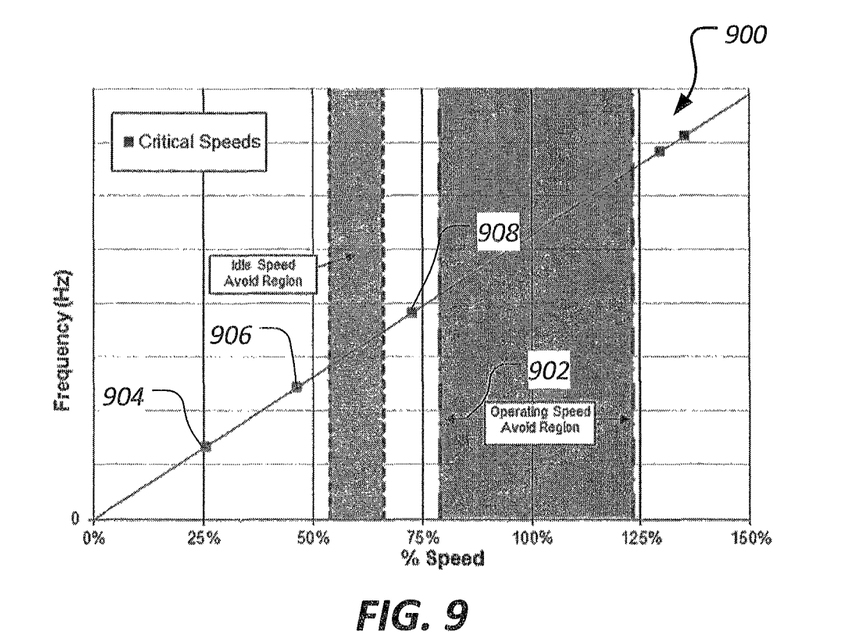
FIG. 9 is a critical speed map showing three critical speeds of the TRDS of FIG. 2.

Referring now to FIG. 9, a critical speed map 900 showing speed bands to avoid and showing predicted critical speeds is provided. In some embodiments, TRDS 110 is configured to operate in an operating speed range 902 above each of a first critical speed 904, a second critical speed 906, and a third critical speed 908.

Figure 10:
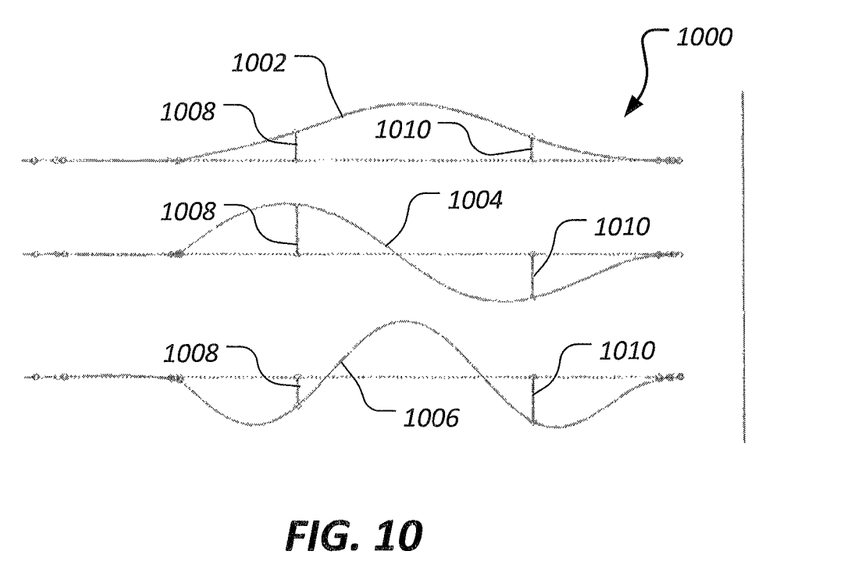
FIG. 10 is a chart depicting a series of mode shapes of a supercritical shaft of the TRDS of FIG. 2.

Referring now to FIG. 10, a series 1000 of supercritical shaft 120 mode shapes associated with the first, second, and third critical speeds 904, 906, and 908. More specifically, mode shape 1002 is the mode shape associated with the first critical speed 904, mode shape 1004 is the mode shape associated with the second critical speed 906, and mode shape 1006 is the mode shape associated with the third critical speed 908. The vertical lines 1008 represent a first location of a first friction damper 200 along the length of the supercritical shaft 120 and the vertical lines 1010 represent a second location of a second friction damper 200 along the length of the supercritical shaft 120. The series 1000 shows that with the selected locations of the dampers 200, each of the dampers 200 participate significantly in the modes generated at each of the three critical speeds.

Most generally, the helicopter 100 can be operated by powering up the engine 106 and thereby gradually increasing a rotating speed of the subcritical shaft 116 and the supercritical shaft 120. With a sufficient increase in rotational speed, the supercritical shaft 120 can approach a first critical speed 904 and the supercritical shaft 120 can bend and take the form of the mode shape 1002. With friction dampers 200 connected to the supercritical shaft 120 at locations 1008 and 1010, the friction dampers 200 can utilize the bearing assembly 206, in some cases comprising a roller bearing assembly, can transmit rotating motions to the fixed system structural components of the tail boom 104. The friction dampers 200 can also provide a centering stiffness while also allowing the dampers 200 to react steady loads. The friction dampers 200 can provide continuous damping using the friction assemblies 210 while also providing the centering stiffness using the flexures 212. In this embodiment, the flexure 212 stiffness is tuned to provide a relatively low stiffness such that motion at the friction assemblies 210 is allowed, thereby ensuring sufficient damping force is provided.

Figure 11:
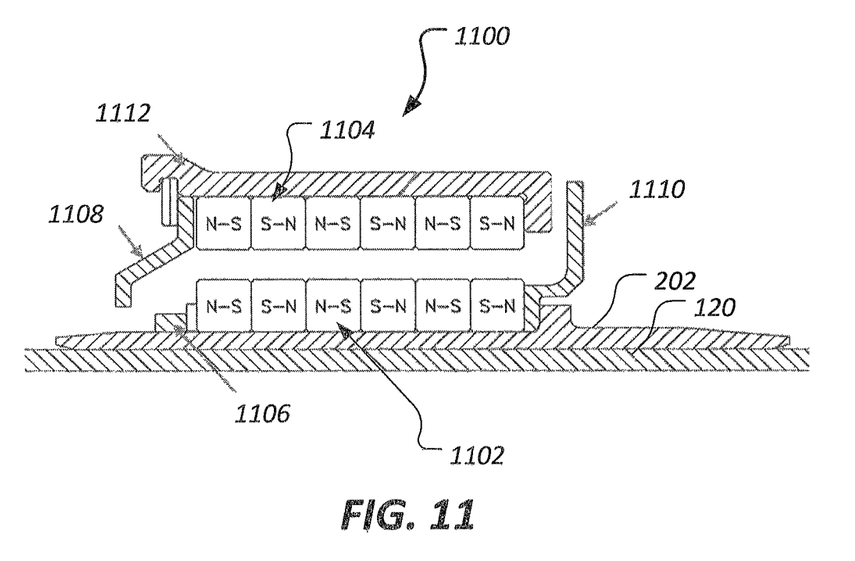
FIG. 11 is a partial view of a permanent magnet bearing that can be substituted for a roller bearing assembly of the damper system of FIG. 3.
Figure 12:
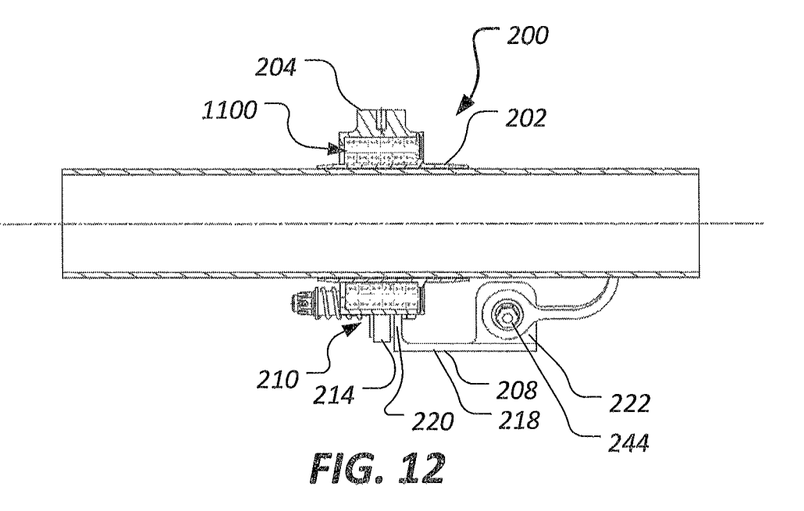
FIG. 12 is a simplified cross-sectional view of a damper system comprising a permanent magnet bearing.

Referring now to FIG. 11, a partial cross-sectional view of a permanent magnet bearing 1100 is shown according to an embodiment of this disclosure. The permanent magnet bearing 1100 generally comprises six rotating magnets 1102 and six stationary magnets 1104. Each magnet comprises a thin circular ring with a square cross-sectional shape and comprises Neodymium Iron Boron (Nd—Fe—B). The permanent magnet bearing 1100 further comprises a shrink ring 1106, a first shield 1108, a second shield 1110, and a damper inner member 1112. Referring now to FIG. 12, a simplified cross-sectional view of a friction damper 200 comprising a permanent magnet bearing 1100 is shown with the permanent magnet bearing 1100 in place of the bearing assembly 206 that generally comprised rolling elements.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A tail rotor drive system (TRDS), comprising:
 a shaft;
 a housing extending around the shaft;
 a mount coupled to the housing via a pair of friction assemblies and a pair of u-shaped flexures; and
 a bearing assembly disposed between the housing and the shaft;
 wherein each friction assembly comprises a biasing spring and a pair of friction rings;
 wherein the mount is sandwiched between each pair of friction rings; and
 wherein each flexure is planar in shape having a constant planar thickness across the entire flexure, and the pair of flexures being non-parallel to each other.

2. The TRDS of claim 1, wherein the shaft comprises a supercritical shaft configured for operation above a critical speed;
 wherein the critical speed is greater than or equal to twenty five percent of operating speed.

3. The TRDS of claim 1, wherein each flexure comprises: titanium.

4. The TRDS of claim 1, wherein each flexure comprises: a U-shape.

5. The TRDS of claim 1, wherein each flexure comprises:
 a first leg;
 a second leg; and
 only a curved portion connecting the first leg to the second leg.

6. The TRDS of claim 5, wherein the first leg is shorter than the second leg.

7. The TRDS of claim 6, wherein the first leg is attached to the mount.

8. The TRDS of claim 6, wherein the second leg is attached to the housing.

9. The TRDS of claim 1, wherein the bearing assembly is configured to constantly react to a load of the shaft.

10. The TRDS of claim 9, wherein the bearing assembly comprises:
 roller elements.

11. The TRDS of claim 9, wherein the bearing assembly comprises:
 a permanent magnet.

12. The TRDS of claim 1, wherein the flexures are configured to bias the shaft to a radially centered position.

13. The TRDS of claim 1, wherein the friction assemblies are configured to accommodate radial movement of the shaft and associated housing.

14. A helicopter, comprising:
 a tail rotor drive system (TRDS) comprising:
  a shaft;
  a housing extending around the shaft;
  a mount coupled to the housing via a pair of friction assemblies and a pair of flexures, each flexure is a planar u-shaped member having a constant planar thickness across each of the entire flexure in the pair of flexures, and the flexures being non-parallel to each other; and
  a bearing assembly disposed between the housing and the shaft;
 wherein each friction assembly comprises a biasing spring and a pair of friction rings;
 wherein the mount is sandwiched between each pair of friction rings;
 wherein the planar u-shaped member has exactly a first leg and a second leg connected by a curved portion;
 wherein the first leg is attached to the mount; and
 wherein the second leg is attached to the housing.

15. The helicopter of claim 14, wherein the shaft comprises:
 a supercritical shaft configured for operation above a critical speed.

16. The helicopter of claim 14, wherein the bearing assembly is configured to constantly react to a load of the shaft.

17. A friction damper, comprising:
 a housing configured for extending around a shaft;

a mount coupled to the housing via a friction assembly and a pair of flexures, the flexures being non-parallel to each other; and a bearing assembly disposed between the housing and the shaft wherein each flexure comprises:

a U-shaped plate-like structure comprising:
   a first leg;
   a second leg; and
   only a curved portion connecting the first leg to the second leg;

wherein the friction assembly comprises a biasing spring and a pair of friction rings;

wherein the mount is sandwiched between the pair of friction rings;

wherein the first leg is shorter than the second leg;

wherein the first leg is attached to the mount;

wherein the second leg is attached to the housing; and wherein the bearing assembly is configured to constantly react to a load of the shaft.

\* \* \* \* \*